Dec. 1, 1942.     C. ADAMOLI     2,303,783
MANUFACTURE OF METAL FLUORIDES
Filed Sept. 16, 1938
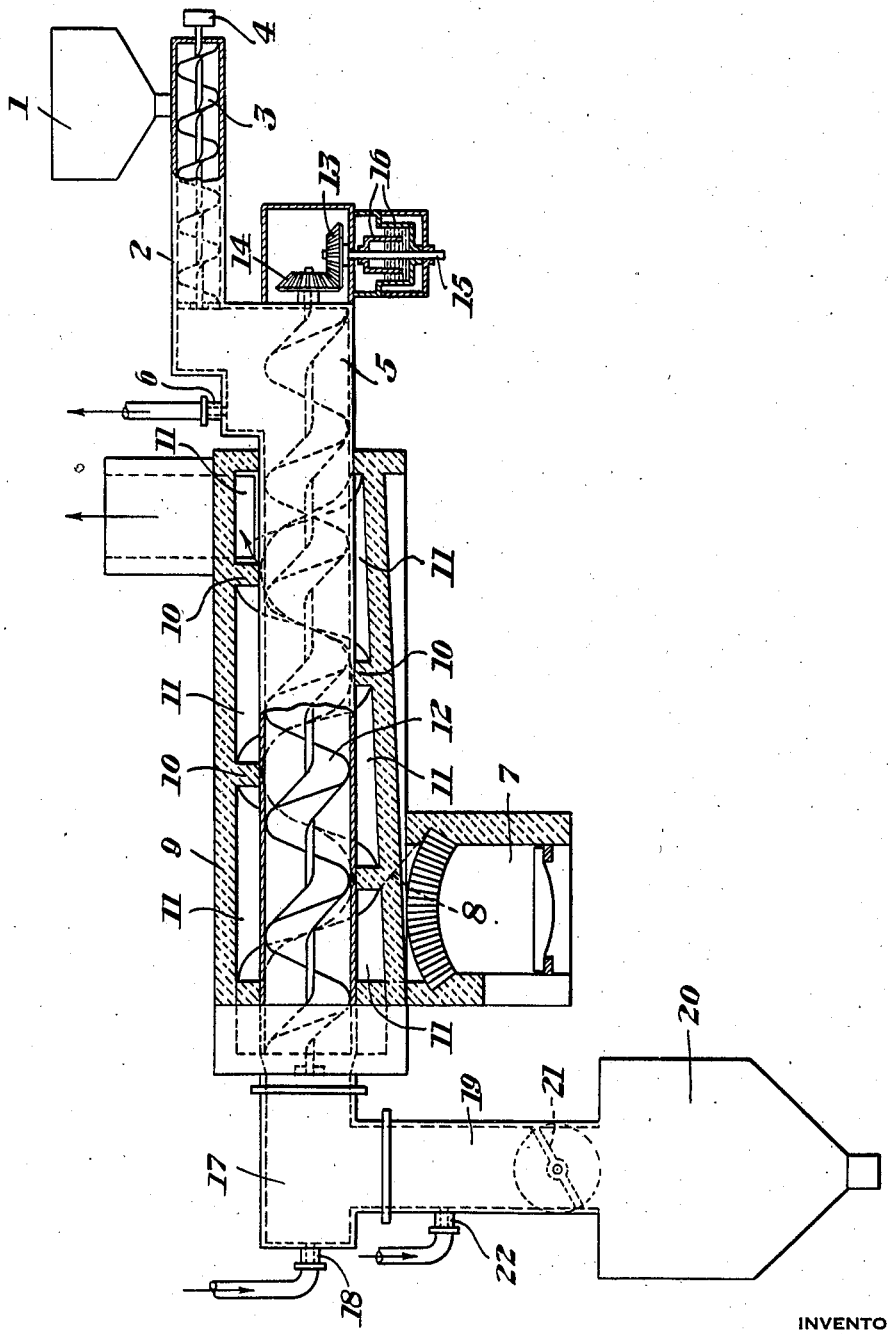
INVENTOR
Carlo Adamoli
by
Stebbins and Blenko.
His Attys.

Patented Dec. 1, 1942

2,303,783

UNITED STATES PATENT OFFICE 2,303,783

MANUFACTURE OF METAL FLUORIDES

Carlo Adamoli, Milan, Italy, assignor to Perosa Corporation, Wilmington, Del., a corporation of Delaware Application September 16, 1938, Serial No. 230,334
In Italy September 18, 1937

6 Claims. (Cl. 23—88)

This application is a continuation-in-part of application Serial No. 172,870, filed November 5, 1937, and relates to a process for the manufacture of anhydrous metal fluorides free from constituents other than fluorine and metal. It relates more particularly to the manufacture of an anhydrous metal fluoride from an oxide, a hydroxide, or a sulphide of the said metal, or to the manufacture of a mixture of such fluorides simultaneously from oxides, hydroxides or sulphides of metals.

The invention is described below more especially with respect to the manufacture of beryllium fluoride but it should be understood that it is broadly applicable to the manufacture of other metal fluoride or of a mixture of several fluorides, by applying reactions of the same kind as are herein described for the manufacture of beryllium fluoride.

The physico-chemical conditions under which it is possible to obtain the compound of fluorine and beryllium which corresponds exactly to the formula $BeF_2$ are already known from an academic standpoint. Up till now, it has not been possible to industrially achieve the manufacture of this fluoride except by the process previously patented by the applicant, according to which the double fluoride of beryllium and ammonium is subjected to a heating process causing the distillation of ammonium fluoride, which is volatile, and thus permitting the separation and recovery of beryllium fluoride $BeF_2$.

In accordance with the present invention the said fluoride of beryllium $BeF_2$ is prepared in an anhydrous state and free from oxide, by applying industrially under certain conditions which will be set forth below, the reaction of gaseous hydrofluoric acid, even in the presence of water, on the oxides, hydroxides or sulphides of beryllium.

The process according to the invention therefore consists in the case of the manufacture of beryllium fluoride, in causing to react in the hot, on the oxide or hydroxide of beryllium, preferably in the dry state, gaseous hydrofluoric acid, in the dry or even non-anhydrous state, but with a water content in any case not exceeding 20%.

This hydrofluoric acid gas, acting advantageously in a closed vessel charged with the gas at normal or superatmospheric pressure, is supplied in a quantity equal to or exceeding that necessary for the fluorination of the quantity of beryllium oxide or hydroxide which has been introduced in the vessel.

The reaction between the hydroxide and the hydrofluoric acid gas is as follows:

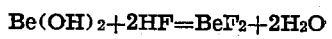

$$Be(OH)_2 + 2HF = BeF_2 + 2H_2O$$

A discontinuous production of beryllium fluoride is thus obtained.

It is likewise possible to cause the hydrofluoric acid to react in the form of a continuous gaseous current, which allows of the carrying out of a particularly interesting modus operandi which comprises the continuous action of a current of hydrofluoric acid gas and gives a continuous production of beryllium fluoride. It is moreover possible, in this case, to effect a constant and continuous introduction, in counter-current direction, of beryllium hydroxide, $Be(OH)_2$ in the process.

It is also possible to intensify the action of the hydrofluoric acid by subjecting to pressure the mass which is under reaction; in fact, the operation is effected under particularly advantageous conditions when the hydrofluoric acid is under pressure in relation to the hydroxide or oxide of beryllium.

It is likewise possible to carry out the operation on the dry hydrated-oxide of beryllium, previously subjected to a compression (which permits of the reduction in volume of the reaction vessel and of obtaining a smaller consumption of thermal energy).

When other metal fluorides than beryllium fluoride, are to be produced, an oxide, a hydroxide or a sulphide of the metal which is to be combined with fluorine is used, in which case the operation is preferably carried out in a continuous manner, as herein described.

According to a further feature of the invention it is as a rule better to carry out the reaction in the presence of an inert gas such as carbon dioxide ($CO_2$) or $N_2$, to prevent oxidation reactions and to ensure the removal of water vapours formed by the reaction. The presence of $CO_2$ is the best method of avoiding with certainty the risk of formation of the oxyfluoride. It is advantageous to use an inert gas which is condensable and is not substantially soluble in water at atmospheric pressure as in that case, it can easily be separated from the water vapours developed by the reaction. This can be done by condensing the mixture of inert gas and water-vapors produced by the reaction, and the inert gas may be dried and returned to the reaction vessel.

Concerning the temperature at which it is convenient to carry out the process, the said temperature should be high but care has to be taken that volatilisation of the beryllium fluoride which is formed is prevented. The temperature can be lowered to slightly below the melting temperature of beryllium fluoride, by which means the latter is obtained in a granular or spongy state, but not as a liquid. In most cases it is convenient to work at a temperature lower than 700–750° C.

It is best to use, in order to perform the reaction, vessels (tubes, furnaces or other vessels) constituted or protected, by means of materials such as for example fluorspar $CaF_2$ and/or the oxide of beryllium, or vessels made out of the very metal which is to be bound to the fluorine. When using non metallic material this should be employed in such manner that it forms a body or coating on the inner face of the vessel, which body or coating should be made very tight and compact in order to be impermeable and resistant to attack by the gaseous hydrofluoric acid. In other words, the reaction is caused to preferably take place in a vessel covered with if not composed of, materials which owing to their nature and method of preparation, cannot be disintegrated or deteriorated by the gaseous hydrofluoric acid, and which are such that the beryllium fluoride formed is not contaminated with other compounds during the process. All this is done by any means well known in the art.

It may be mentioned that, in certain cases, notably for producing beryllium fluoride in the presence of one or more fluorides of other metals, in particular the metals intended to be alloyed with beryllium, the reaction may be carried out in a vessel attackable by hydrofluoric acid, in such a manner as to produce the fluoride or fluorides of the other metals in question. By this means it is possible to utilize for making the vessel or the coating of the same, materials capable of being attacked by the gaseous hydrofluoric acid at the temperature of the reaction.

It is likewise possible, with a view of obtaining in the same operation the production of beryllium fluoride and of fluorides of other metals, to perform the reaction of HF on a mixture of different metallic oxides, hydroxides or sulphides, in such a way as to produce, at the same time as the beryllium fluoride, fluorides corresponding to the metal or metals of the said metallic compounds.

As an example of the process according to the invention, gaseous hydrofluoric acid is caused to react on dry beryllium hydroxide placed in a tube of fluorspar or beryllium oxide maintained at a temperature of 700–750° C. In this manner, the whole of the beryllium hydroxide is transferred completely into completely anhydrous beryllium fluoride free from oxide in the form of solid grains.

The accompanying drawing illustrates diagrammatically, parts being shown in section, an apparatus for carrying out the process in a continuous manner, thus avoiding any undue loss of heat and increasing the output of the apparatus. The following description relates to the treatment of any kind of starting material according to the invention but the operation will be more particularly described as applied to the manufacture of beryllium fluoride from beryllium oxide.

Referring more particularly to the drawing, beryllium oxide stored in a trough 1 is delivered to a conduit 2 where the propelling screw 3 actuated by means of a pulley 4 delivers it to a longitudinal reaction vessel 5 which is heated from the outside by a furnace 7. A chamber 9 surrounds the reaction vessel, the chamber being provided with wall partitions 10 made of beryllium fluoride and forming a helical flue 11 around the outside of the reaction vessel 5. The hot gases and fumes from the furnace pass through a flue 8 into and through the helical flue 11 surrounding the reaction vessel and escape through the chimney.

The reaction vessel 5 is provided with a propelling screw 12 which is rotated by gearing 13, 14, the gear 13 being provided with a shaft 15 which passes through a conventional hydraulic seal 16. The screw 12 feeds the beryllium oxide through the reaction vessel 5 from right to left as viewed in the drawing and delivers it to a conduit 17.

Hydrofluoric acid gas is supplied to the conduit 17 through an inlet 18 and flows through the reaction vessel 5 in a direction counter-current to the passage of the beryllium oxide. The temperature in the reaction vessel is preferably from 700–750° C. The hydrofluoric acid gas may be supplied either in the dry state or when the temperature is as specified it may contain water but not to exceed 20%. The reaction converts the beryllium oxide into beryllium fluoride and the hot gases evolved from the reaction are led off from the reaction vessel through the outlet 6.

The beryllium fluoride formed in the reaction vessel passes into the conduit 17 and falls into the conduit 19 provided with a valve 21. Carbon dioxide or other inert gas is admitted to the conduit 19 through the inlet 22, in order to prevent oxidation of the beryllium fluoride. The valve 21 is opened from time to time and beryllium fluoride falls into the trough 20. When regulating the temperature in the reaction vessel 5 as above explained, the beryllium fluoride is obtained in the conduits 17 and 19 in a solid spongy or granulated form which facilitates its delivery from the apparatus. The carbon dioxide acts not only to provide an inert atmosphere in the apparatus but also being heavier than hydrofluoric gas displaces out of the granulated beryllium fluoride the gaseous hydrofluoric acid with which the beryllium fluoride is mixed. The mixture of $CO_2$ water vapors and hydrofluoric acid gas escaping through the outlet 6 can be passed to any suitable conventional condenser and dryer and the so recovered $CO_2$ may be returned to the apparatus through the inlet 22.

What I claim is:

1. Process for obtaining beryllium fluoride in a substantially pure anhydrous state consisting in causing gaseous hydrofluoric acid to react at elevated temperature but below the melting point of beryllium fluoride on beryllium hydroxide, the starting materials being so dry and in such a proportion that the humidity of the gaseous hydrofluoric acid in contact with the beryllium hydroxide never exceeds 20%.

2. Process for obtaining beryllium fluoride in a substantially pure anhydrous state consisting in causing gaseous hydrofluoric acid to react at elevated temperature but below the melting point of beryllium fluoride and in the form of a continuous current of gas on beryllium hydroxide, the starting materials being so dry and in such a proportion that the humidity of the gaseous hydrofluoric acid in contact with the beryllium hydroxide never exceeds 20%.

3. Process according to claim 2, in which the beryllium hydroxide is fed in a continuous manner in countercurrent direction with respect to the direction of the gaseous hydrofluoric acid current.

4. Process for obtaining beryllium fluoride in a substantially pure anhydrous state consisting in causing gaseous hydrofluoric acid to react at elevated temperature but below the melting point of beryllium fluoride in the presence of an inert gas in substantial amount and in a non-oxygenated atmosphere, on beryllium hydroxide, the starting materials being so dry and in such a proportion that the humidity of the gaseous hydrofluoric acid in contact with the beryllium hydroxide never exceeds 20%.

5. Process for obtaining beryllium fluoride in a substantially pure anhydrous state consisting in causing gaseous hydrofluoric acid to react at elevated temperature but below the melting point of beryllium fluoride in the presence of an atmosphere of gaseous carbon dioxide and in substantial amount and in a non-oxygenated atmosphere, on beryllium hydroxide, the starting materials being so dry and in such a proportion that the humidity of the gaseous hydrofluoric acid in contact with the beryllium hydroxide never exceeds 20%.

6. Process for obtaining beryllium fluoride in a substantially pure anhydrous state consisting in causing gaseous hydrofluoric acid to react at elevated temperature but below the melting point of beryllium fluoride in the presence of an atmosphere of nitrogen in substantial amount and in a non-oxygenated atmosphere, on beryllium hydroxide, the starting materials being so dry and in such a proportion that the humidity of the gaseous hydrofluoric acid in contact with the beryllium hydroxide never exceeds 20%.

CARLO ADAMOLI.